Nov. 6, 1951 W. R. JACK ET AL 2,574,395
TORSIONAL BALANCE DEVICE
Filed March 18, 1950
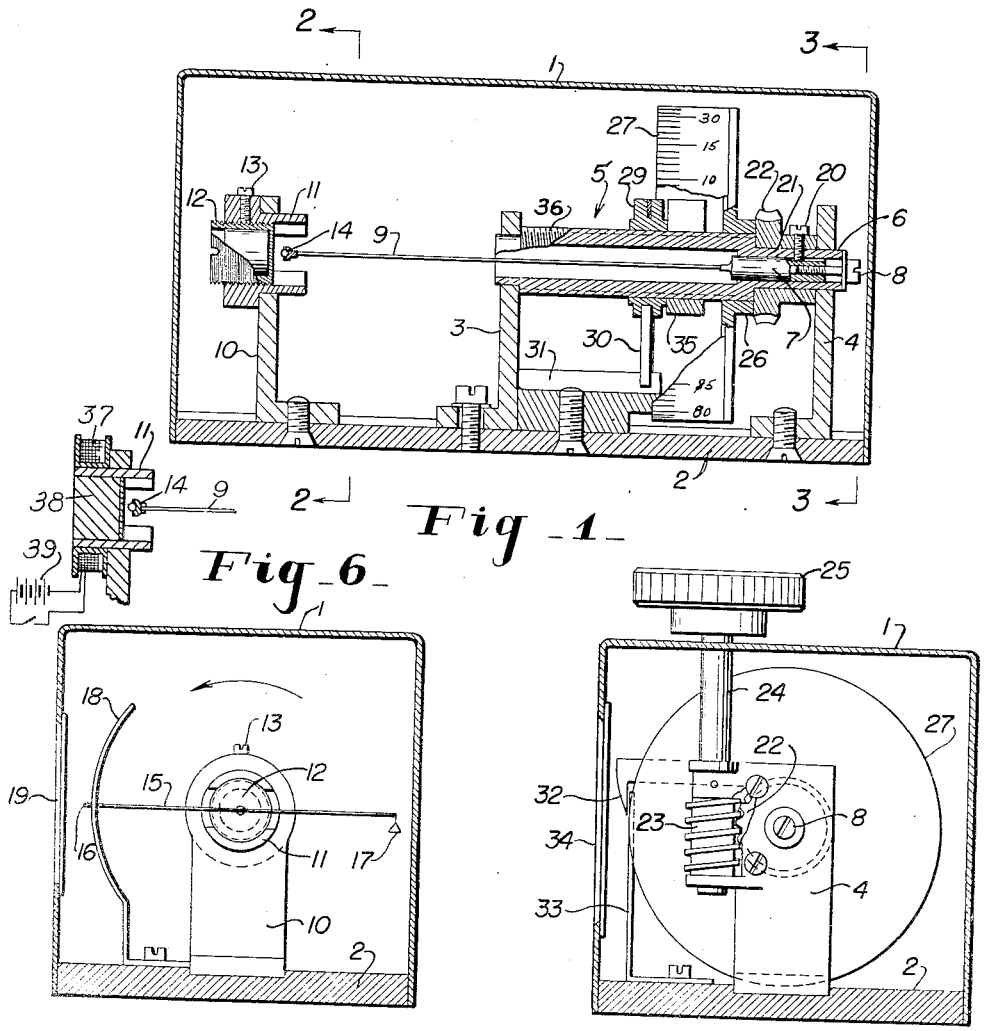
Fig_1_
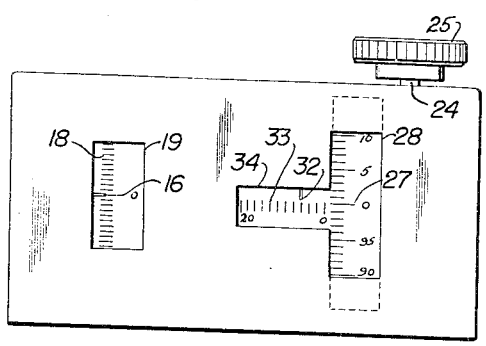
Fig_2_ Fig_3_
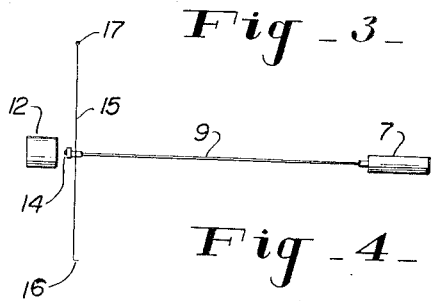
Fig_5_ Fig_4_
INVENTORS.
WILLIAM R. JACK
BY EMIL M. BRINKER
Frank H. Harmon
ATTORNEY Patented Nov. 6, 1951

2,574,395

UNITED STATES PATENT OFFICE 2,574,395

TORSIONAL BALANCE DEVICE

William R. Jack, Chagrin Falls, and Emil M. Brinker, Lakewood, Ohio; said Brinker assignor to said Jack Application March 18, 1950, Serial No. 150,382

12 Claims. (Cl. 73—382)

This invention relates in general to improvements in measuring and indicating devices and more particularly to apparatus adapted for measuring and indicating forces by introducing counterbalancing forces by the twisting of an elastic suspension medium and measuring the degree of applied twisting force necessary to establish a predetermined initial equilibrium of the suspension medium.

More specifically the invention relates to improvements in torsional balance devices which are highly sensitive for measuring minute variations in forces. In such apparatus, it is common practice to mechanically secure a torsional suspension arm in the form of a length of wire, fibre, or the like, at two spaced points under longitudinal spring tension and to secure thereto midway of its length a light weight cross arm, one end of which carries a given mass. The tendency of the mass to swing, in response to the force to be measured, introduces a longitudinal torsion in the torsional suspension arm and the horizontal equilibrium of the cross arm is established by manually twisting the torsional suspension arm in the opposite direction. Accordingly, by means of appropriately calibrated scales, the degrees of variations in magnitude of the forces on the mass are readily determined by the scale-indicated manual opposed torsion required to maintain horizontal equilibrium of the weighted cross arm.

Such a conventional apparatus defeats its own purpose in many respects as to physical durability, degree of sensitivity and fineness of degree of indicated measurement of variations of magnitude of the forces to be measured. Due to the fact that the torsional suspension arm is physically secured at its two ends so as to be under longitudinal spring tension, the weighted cross arm is invariably secured to the torsional suspension arm midway of the length of the latter. Thus, the effective length of the torsional suspension arm, insofar as its torsional sensitivity is concerned, is divided in two, or equal to one half of its length. Moreover, such a suspension system limits the degree of fineness of diameter of a useable torsional suspension arm because of mechanical stresses imposed, increases its sensitivity to shock and vibration to lessen its measuring efficiency and increases its possibility of breakage under such undesired external forces in actual use.

One of the primary objects of the invention is to provide an improved torsional balance device wherein the weighted cross arm is secured to the torsional suspension arm virtually at the end of the latter opposite the end secured to the manual torsional control so as to obtain virtually the entire length of the torsional suspension arm for purposes of obtaining maximum sensitivity of the measuring apparatus.

A further object is to provide in such an apparatus, a torsional suspension arm whose one end is secured to a manual control and whose other end is free and not mechanically secured to anything, but is under longitudinal tension and maintained taut and horizontal solely by magnetic means employing permanent magnets or electromagnets carried either by the frame or the suspension arm or both.

As a further and specific example, it is proposed to secure a magnetically attracted ball element to the free end of the torsional suspension arm, which ball element is spaced from a longitudinally adjustable magnetic means carried by the frame of the apparatus.

With the foregoing and other objects in view, the invention resides in the combination of parts and in the details of construction hereinafter set forth in the following specification and appended claims, certain embodiments thereof being illustrated in the accompanying drawings, in which:

Figure 1 is a view partly in side elevation and partly in vertical section of the torsional balance device, with the side of the casing removed;

Figure 2 is a view in section taken along line 2—2 of Figure 1;

Figure 3 is a view in section taken along line 3—3 of Figure 1;

Figure 4 is a schematic view in top plan showing the suspension arm, its magnetic means of suspension and the weighted cross arm supported by the suspension arm;

Figure 5 is a view in side elevation of the encased torsional balance device; and Figure 6 is a fragmentary view in longitudinal section showing the permanent magnet of Figure 1 replaced by an electromagnet.

The basic idea of the present invention involves the measurement of forces by having an elastic medium subjected to such forces and by introducing a measured opposing force sufficient to counterbalance the force whose magnitude it is desired to determine. The present invention is capable of many applications for determining the magnitude of many types of forces, as will further be dealt with hereinafter. However, for mere purposes of specific disclosure, it will be described in connection with a scale for measuring the weight of a given mass.

Accordingly, the instrument may comprise a casing 1. Secured inside of the casing and to the bottom plate 2 are uprights 3 and 4 that form end bearing supports for a rotatable hollow shaft, generally indicated at 5. Inside of the reduced right end 6 of the hollow shaft 5 is slidably secured a sleeve 7 which is longitudinally adjustably maintained therein by an adjusting screw 8. This sleeve 7 has secured thereto a suspension arm having torsional elastic properties and which may take the form of a quartz fibre of minute diameter, and such as shown at 9, which extends from the sleeve 7 throughout and considerably past the other end of the hollow shaft 5.

Also secured in the casing to the bottom plate 2 near the left end of the casing is an upright 10 for supporting a sleeve 11 in which is longitudinally adjustably screw threaded a permanent magnet 12. A set screw 13 may be provided for maintaining the magnet in the desired adjusted position. To the left end of the suspension arm 9 is secured a magnetically attracted member, such as a ball 14. As shown in Figures 1 and 4, the magnetic attraction of the ball 14 for the magnet 12 maintains the suspension arm 9 longitudinally under tension and taut to be horizontally disposed although the left end of the suspension arm is free and physically unattached to the frame. If desired, the permanent magnet of Figure 1 may be supplanted by an electromagnet including a core 38, winding 37 and an electrical source 39, as shown in Figure 6. The importance of this feature will be dealt with in greater particularity hereinafter.

Supported by the suspension arm near its free left end and just to the right of the ball 14 is a cross arm 15. This cross arm 15 is secured to suspension arm 9 and may be a hollow tube of such material as glass or light weight metal, such as aluminum, to which the fibre 9 is connected crosswise and secured thereto against slippage. One end of the cross arm terminates in a scale pointer 16 and to the other end is detachably and pivotally secured a mass 17 whose weight is to be analyzed. The pointer 16 registers with a graduated scale 18, secured to bottom plate 2, and the pointer and scale are visible through a side window 19 in the casing.

Secured about the reduced right end portion 6 of hollow shaft 5 by screw 20 is a sleeve 21 that carries a gear 22. This gear 22 meshes with a worm 23 carried by a rotatable shaft 24 that extends through the top of the casing to receive a knurled manual control knob 25 for turning the shaft 24, worm 23, gear 22 and consequently shaft 5 in either direction to any desired degree. Secured about hollow shaft 5 and to rotate therewith is a sleeve 26 integral with which is a calibrated drum scale 27 that is visible through a side window 28 in the casing. Consequently, a turning of knob 25 results in a rotation of drum scale 27 in a corresponding direction.

As shown in Figure 1, a portion of the larger diameter portion of hollow shaft 5 is screw threaded at 36 to receive a screw threaded follower hollow sleeve 29 which carries a depending arm 30 that engages a slide bracket 31 secured to bottom plate 2. Thus, a turning of shaft 5 results in turning drum 27, but the follower 29 is prevented from turning, due to the engagement of arm 30 with bracket 31, and hence the follower merely moves along shaft 5 longitudinally as the shaft 5 is turned. Follower 29 carries a pointer 32 that registers with a graduated scale 33 secured to bottom plate 2 and is visible in a casing side window 34. As a matter of precaution, the hollow shaft 5 may rigidly carry a sleeve 35 to form a limit stop for follower 29 in one direction and support 3 may form a limit stop in the other direction.

With the above described apparatus, the problem presented may be that of measuring the weight of mass 17. With the permanent magnet 12, or electromagnet 37, 38, 39, properly adjusted to provide a proper magnetic pull on ball 14, while the ball remains spaced from the magnet to maintain the suspension fibre arm 9 horizontally taut under longitudinal tension with the imposed weight of the cross arm 15 and its weight mass 17, the effect of gravity pull on the mass 17 is to cause the cross arm, which is initially statically balanced when unweighted, to pivot about its point of connection to fibre arm 9 and to torsionally twist the latter longitudinally as the mass swings toward the bottom of the casing. Referring to Figure 2, which shows the weight on the right end of the cross arm, such gravitational swing would be in a clockwise direction. The knob 25 is then turned in the opposite direction to oppose such force in a counterclockwise direction, as indicated by the arrow.

The knob 25 is turned until pointer 16 registers with a zero reading on scale 18 to indicate a true horizontal position of the cross arm. The amount of opposing force necessary to counterbalance the torsional deformation of fibre arm 19 and to reinstate the lateral equilibrium of the cross arm is measured in degrees on the rotated drum 27, and the number of complete turns of drum 27 is indicated by pointer 32 of the follower 29 on scale 33.

The conventional practice in torsional balance devices is well exemplified in U. S. patent to Wright, 1,579,273, April 6, 1926, in which both ends of the suspension arm are mechanically secured to end members of the frame to physically place the suspension arm under longitudinal spring tension. In this particular patent the suspension arm is a helix of silica glass or tungsten wire. U. S. patent to Ahrndt 2,124,968, July 26, 1938, shows a straight suspension arm mechanically connected at both ends to the mounting frame. Others have used a substantially straight arm, both ends of which are mechanically secured to the frame and a spring element interposed to introduce physical spring tension longitudinally of the suspension arm. This necessitates the securing of the cross arm midway of the length of the suspension arm, which is also clearly demonstrated in the above noted Wright and Ahrndt patents.

Such conventional devices have many disadvantages and limitations. Insofar as sensitivity and fineness of measurement is concerned, such conventional devices, in which it is necessary to connect the cross arm midway of the length of the suspension arm because the latter has its both ends mechanically connected to be under longitudinal spring tension, utilize only one half of the length of the torsional suspension arm. Moreover, in such conventional devices, the suspension arm is subjected to vibration, shock and breakage, is hampered in its movements by friction and torque, and its diameter, which should be as minute as possible for sensitivity, is definitely limited in size by reason of mechanical stresses imposed by its mechanical attachment at its both ends for support.

The present invention overcomes these and other disadvantages and limitations. The magnetic suspension of one end of the fibre arm, which is otherwise free, places the fibre arm sufficiently under tension for the desired purposes but not under spring tension or any other mechanical stress. It is therefore not mechanically subject to breakage by vibration or shock. This makes it possible to reduce the diameter of the fibre arm to a very minute one for sensitivity and removes the limit on the fineness of its diameter.

Moreover, due to this novel supporting system of the suspension arm, whether it be of fibre or other selected material, there is removed the necessity of securing the cross arm midway of the length of the suspension arm. Instead, as previously stated, the present improved device includes the securing of the cross arm virtually at the free end of the suspension arm in order to utilize virtually the full length of the suspension arm. This increases the sensitivity of measurement of forces over conventional systems by the factor of four, not counting the fact that the present invention places virtually no limit on the reduction of the diameter of the suspension arm. Furthermore, the present invention involves a null system of measuring which eliminates any possible systematic error.

The change of distance, by simple adjustment, between the magnet and the ball on the free end of the suspension arm, forms a means whereby an adjustment of calibration constant, or angle times weight, may be obtained.

While a permanent magnet 12, or electromagnet 37, 38, 39 and a metal ball 14 have been specifically disclosed, it is to be understood that the underlying principle of support of the suspension arm is to have one end mechanically free of attachment to and in spaced relation from its support. The invention also contemplates the support assembly 11 being non-magnetic and the ball 14 magnetic or both members 11 and 14 being magnetic. Moreover, in the claims, hereinafter, the term magnetic is used to embrace permanent magnets or electromagnets.

In a torsional balance device of the above described sensitivity, precautions should be taken to avoid error due to such influence as electrostatic charges, convection air currents, and the like. In order to eliminate such effects the torsional suspension arm and the cross arm should be coated with some conductive material and the device be protected in the casing from temperature changes. When the device is used as an altimeter it should be previously mounted in vacuum in the casing. When the device is used as a torsional balance scale it should be mounted in air at a constant temperature.

Moreover, whereas the torsional balance device, for purposes of illustration, has been specifically described as applicable to a torsional balance scale, it is to be understood that it has many applications for actual use such as an altimeter, accelerometer, magnetometer, minerological prospecting instrument, chemical scales, for medical and pathological research measuring instruments, and many other applications.

We claim:

1. In an apparatus for measuring gravitational forces, a mounting frame, a flexible torsional suspension arm, a manual control secured to one end of said arm for introducing torsion longitudinally of said arm, the other end of said arm being mechanically free and unattached to said frame, a weighted cross arm secured to said suspension arm adjacent the free end of said torsional suspension arm, cooperating means carried by said frame and suspension arm for magnetically supporting the mechanically free end of said suspension arm in spaced relation with the supporting means carried by said frame for maintaining said suspension arm taut and horizontally disposed and indicating means for indicating the position of said cross arm and the torsion introduced in said suspension arm.

2. In an apparatus for measuring gravitational forces, a mounting frame, a flexible torsional suspension arm, a manual control secured to one end of said arm for introducing torsion longitudinally of said arm, the other end of said arm being mechanically free and unattached to said frame, a weighted cross arm secured to said suspension arm adjacent the free end of said torsional suspension arm, magnetic means carried by said frame for supporting the mechanically free end of said suspension arm in spaced relation with said magnetic supporting means for maintaining said suspension arm taut and horizontally disposed and indicating means for indicating the position of said cross arm and the torsion introduced in said suspension arm.

3. In an apparatus for measuring gravitational forces, a mounting frame, a flexible torsional suspension arm, a manual control secured to one end of said arm for introducing torsion longitudinally of said arm, the other end of said arm being mechanically free and unattached to said frame, a weighted cross arm secured to said suspension arm, a member carried by the free end of said suspension arm and an adjacent spaced member carried by said frame one of which members is magnetic for maintaining said suspension arm taut and horizontally disposed and indicating means for indicating the position of said cross arm and the torsion introduced in said suspension arm.

4. In an apparatus for measuring gravitational forces, a mounting frame, a flexible torsional suspension arm, a manual control secured to one end of said arm for introducing torsion longitudinally of said arm, the other end of said arm being mechanically free and unattached to said frame, a weighted cross arm secured to said suspension arm, a magnetically attracted member carried by the free end of said suspension arm and an adjacent magnet carried by said frame and longitudinally spaced from said member for maintaining said suspension arm taut and horizontally disposed and indicating means for indicating the position of said cross arm and the torsion introduced by said suspension arm.

5. In an apparatus for measuring gravitational forces, a mounting frame, a flexible torsional suspension arm, a manual control secured to one end of said arm for introducing torsion longitudinally of said arm, the other end of said arm being mechanically free and unattached to said frame, a weighted cross arm secured to said suspension arm, a magnetically attracted member carried by the free end of said suspension arm and an adjacent longitudinally adjustable magnet carried by said frame and longitudinally spaced from said member for maintaining said suspension arm taut and horizontally disposed and indicating means for indicating the position of said cross arm and the torsion introduced in said suspension arm.

6. In an apparatus for measuring gravitational forces, a mounting frame, a flexible torsional suspension arm, a manual control secured to one end of said arm for introducing torsion longitudinally of said arm, the other end of said arm being mechanically free and unattached to said frame, a weighted cross arm secured to said suspension arm, a magnetically attracted member carried by the free end of said suspension arm and an adjacent longitudinally adjustable magnet with upper and lower structural limit stops for said member on the end of said suspension arm carried by said frame and longitudinally spaced from said member for maintaining said suspension arm taut and horizontally disposed and indicating means for indicating the position of said cross arm and the torsion introduced in said suspension arm.

7. In an apparatus for determining the weight of a given mass, a mounting frame, a flexible torsional suspension arm, a manual control secured to one end of said arm for introducing torsion longitudinally of said arm, the other end of said arm being mechanically free and unattached to said frame, a cross arm secured to said suspension arm and carrying said given mass, cooperating means carried by said frame and suspension arm for magnetically supporting the mechanically free end of said suspension arm in spaced relation with the supporting means carried by said frame for maintaining said suspension arm taut and horizontally disposed and indicating means for indicating the weight of said mass by indicating the position of said cross arm and the torsion introduced in said suspension arm to bring said cross arm to a predetermined initial position.

8. In an apparatus for determining the weight of a given mass, a mounting frame, a flexible torsional suspension arm, a manual control secured to one end of said arm for introducing torsion longitudinally of said arm, the other end of said arm being mechanically free and unattached to said frame, a cross arm secured to said suspension arm and carrying said given mass, magnetic means carried by said frame for supporting the mechanically free end of said suspension arm in spaced relation with said magnetic supporting means for maintaining said suspension arm taut and horizontally disposed and indicating means for indicating the weight of said given mass by indicating the position of said cross arm and the torsion introduced in said suspension arm to bring said cross arm to a predetermined initial position.

9. In an apparatus for determining the weight of a given mass, a mounting frame, a flexible torsional suspension arm, a manual control secured to one end of said arm for introducing torsion longitudinally of said arm, the other end of said arm being mechanically free and unattached to said frame, a cross arm secured to said suspension arm and carrying said given mass, a member carried by the free end of said suspension arm and an adjacent spaced member carried by said frame one of which members is magnetic for maintaining said suspension arm taut and horizontally disposed and indicating means for indicating the weight of said given mass by indicating the position of said cross arm and the torsion introduced in said suspension arm to bring said cross arm to a predetermined initial position.

10. In an apparatus for determining the weight of a given mass, a mounting frame, a flexible torsional suspension arm, a manual control secured to one end of said arm for introducing torsion longitudinally of said arm, the other end of said arm being mechanically free and unattached to said frame, a cross arm secured to said suspension arm and carrying said given mass, a magnetically attracted member carried by the free end of said suspension arm and an adjacent magnet carried by said frame and longitudinally spaced from said member for maintaining said suspension arm taut and horizontally disposed and indicating means for indicating the weight of said given mass by indicating the position of said cross arm and the torsion introduced in said suspension arm to bring said cross arm to a predetermined initial position.

11. In an apparatus for determining the weight of a given mass, a mounting frame, a flexible torsional suspension arm, a manual control secured to one end of said arm for introducing torsion longitudinally of said arm, the other end of said arm being mechanically free and unattached to said frame, a cross arm secured to said suspension arm and carrying said given mass, a magnetically attracted member carried by the free end of said suspension arm and an adjacent longitudinally adjustable magnet carried by said frame and longitudinally spaced from said member for maintaining said suspension arm taut and horizontally disposed and indicating means for indicating the weight of said given mass by indicating the position of said cross arm and the torsion introduced in said suspension arm to bring said cross arm to a predetermined initial position.

12. In an apparatus for determining the weight of a given mass, a mounting frame, a flexible torsional suspension arm, a manual control secured to one end of said arm for introducing torsion longitudinally of said arm, the other end of said arm being mechanically free and unattached to said frame, a cross arm secured to said suspension arm and carrying said given mass, a magnetically attracted member carried by the free end of said suspension arm and an adjacent longitudinally adjustable magnet with upper and lower structural limit stops for said member on the end of said suspension arm carried by said frame and longitudinally spaced from said member for maintaining said suspension arm taut and horizontally disposed and indicating means for indicating the weight of said given mass by indicating the position of said cross arm and the torsion introduced in said suspension arm to bring said cross arm to a predetermined initial position.

WILLIAM R. JACK.
EMIL M. BRINKER.

REFERENCES CITED

The following references are of record in the file of this patent:

UNITED STATES PATENTS

| Number | Name | Date |
| --- | --- | --- |
| 1,746,627 | Babbitt | Feb. 11, 1930 |
| 2,032,381 | Stoutenburg | Mar. 3, 1936 |
| 2,124,968 | Ahrndt | July 26, 1938 |
| 2,255,876 | Clewell | Sept. 16, 1941 |
| 2,291,628 | Ising | Aug. 4, 1942 |